H. P. WALTON.
WEED BURNING APPARATUS.
APPLICATION FILED MAR. 28, 1910.
993,131.
Patented May 23, 1911.
2 SHEETS—SHEET 1.
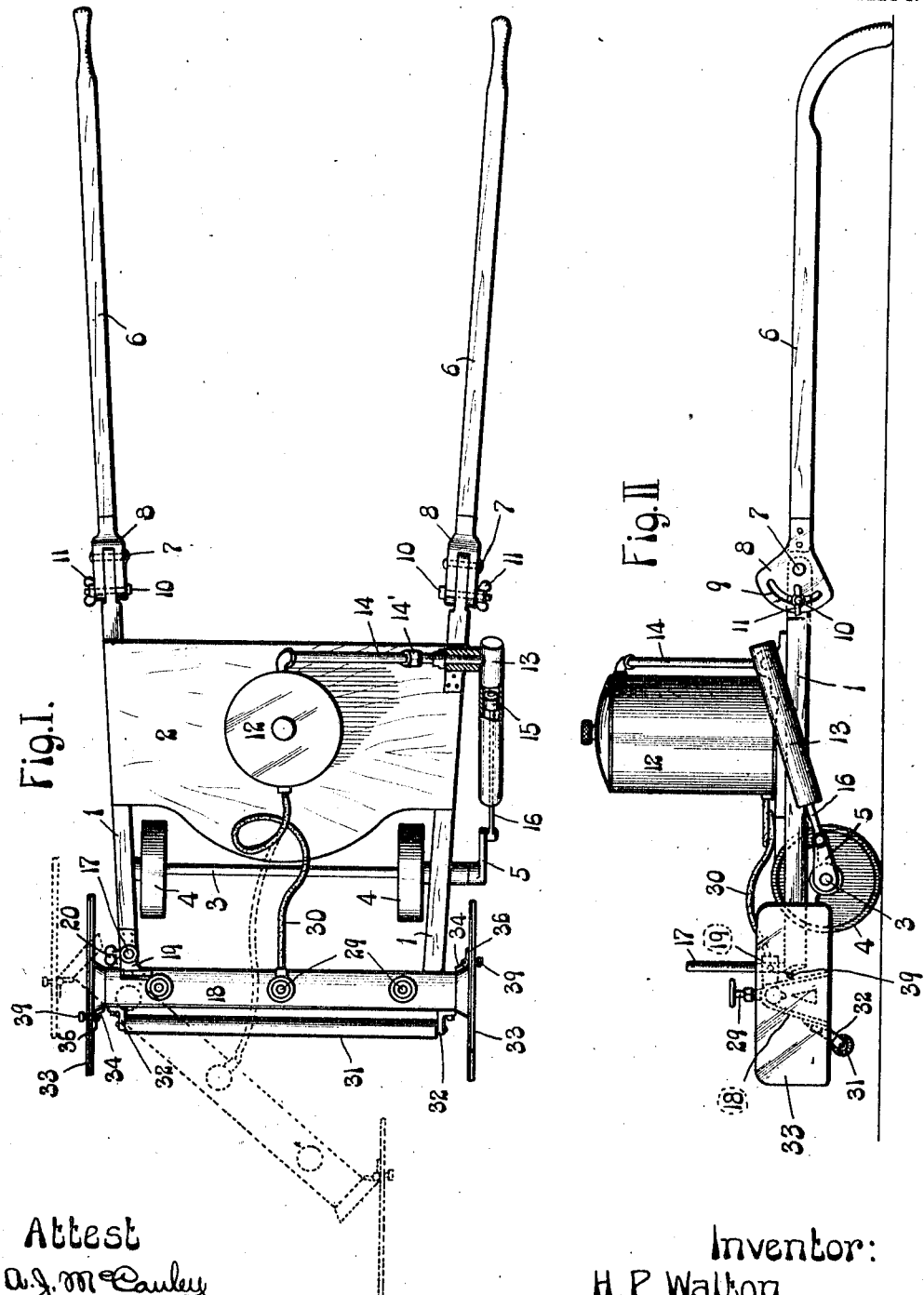
Attest
A. J. McCauley
M. C. Hammon
Inventor:
H. P. Walton
by E. C. Knight Atty.

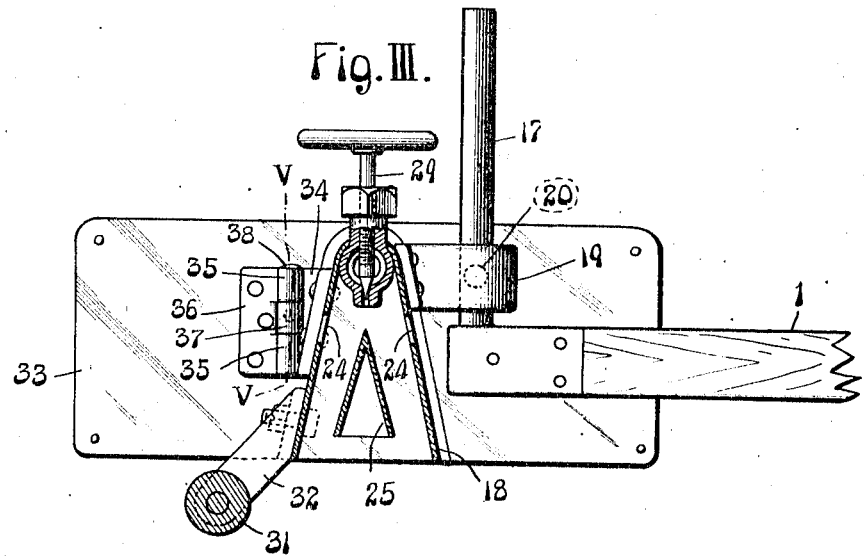
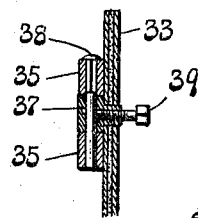
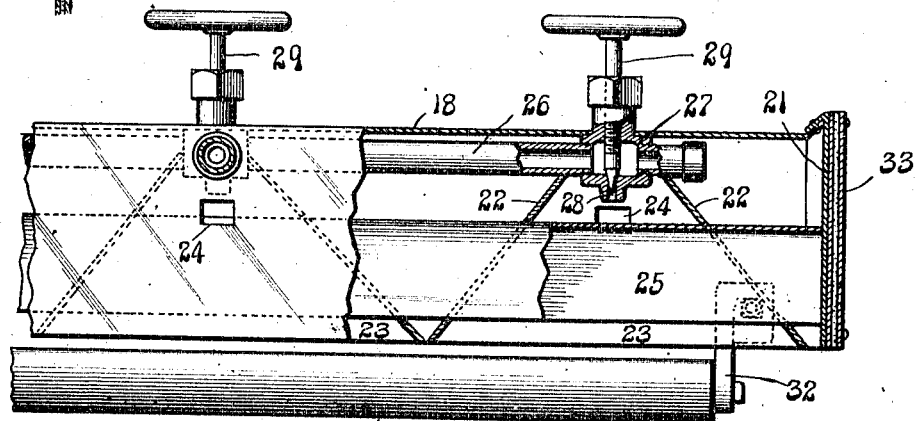

UNITED STATES PATENT OFFICE.

HARRY P. WALTON, OF MINERAL POINT, MISSOURI.

WEED-BURNING APPARATUS.

993,131. Specification of Letters Patent. Patented May 23, 1911

Application filed March 28, 1910. Serial No. 551,878.

*To all whom it may concern:*

Be it known that I, HARRY P. WALTON, a citizen of the United States of America, residing at Mineral Point, in the county of Washington and State of Missouri, have invented certain new and useful Improvements in Weed-Burning Apparatus, of which the following is a full, clear, and exact description, reference being had to the accompanying drawings, forming part of this specification.

My invention relates to an apparatus for burning weeds, and has for its object the production of an apparatus of this description that may be propelled by manual or other power, and by which weeds in the path in which the apparatus is moved may be effectively burned to the ground.

Figure I is a top or plan view of my apparatus. Fig. II is a side elevation of the apparatus. Fig. III is an enlarged cross section at the location of the burner. Fig. IV is in part a rear elevation and in part a longitudinal section through the burner and the parts adjacent thereto. Fig. V is a section taken on line V—V, Fig. III.

In the accompanying drawings: 1 designates the side bars, and 2 a cross piece or platform, which combinedly constitute the main frame of my apparatus. The frame just mentioned is supported by an axle 3 and ground wheels 4 fixed to said axle. At one end of the axle 3 is a crank arm 5.

6 designates handles connected to the side bars of the main frame of the apparatus. These handles are pivotally connected to the frame side bars at 7. In order that the main frame may be maintained in a horizontal position while the apparatus is in use, or in an inclined position relative to a horizontal plane, I provide means whereby the handles may be held in fixed positions when they are arranged either in alinement with the main frame or at an angle relative thereto, such means comprising socket members 8 fixed to the handles and straddling the rear ends of the frame side bars, the sockets being provided with segmental slots 9; and I mount in the side bars near their rear ends bolts 10 provided with clamping nuts 11, through the medium of which the socket members may be held from movement when the handles 6 have been adjusted to positions in alinement with, or out of alinement with, the side bars of the main frame.

12 designates a fuel reservoir mounted upon the cross piece 2 of the main frame of my apparatus, and which is adapted to contain a supply of gasolene, or other liquid fuel. To provide for the delivery of the fuel from this tank to the burner to be hereinafter described, I furnish in the apparatus a pump barrel 13 that is connected to the fuel tank by a pipe 14. Within the pump barrel is a piston 15 that is operable by a piston rod 16 connected to the crank arm 5 fixed to the axle 3. The connecting pipe 14 contains a union 14' that permits swinging movement of the pump barrel 13. During the rotation of the axle 3 and the crank arm 5, the piston rod 16 is reciprocated to move the piston in the pump barrel, during which action, the pump barrel partakes of a swinging movement that is rendered necessary due to the movement of the crank arm 5 in a circular path by reason of said crank arm being fixed to the axle 3.

17 designates a post carried by one of the main frame side bars 1 at its forward end, and which serves as a support for a vertical housing 18 and parts associated therewith. The burner housing is connected to said post by a bracket 19 having a sleeve loosely fitted to the post and in which is a set screw 20 (see Fig. I) that, by binding against the post, will act to hold the housing in any position to which it may be adjusted. The housing 18 extends transversely of the main frame of my apparatus and is of an inverted trough shape, the ends of the housing being closed by end plates 21 (see Fig. IV). Within the housing are inclined division plates 22 that serve to subdivide the interior of the housing into chambers 23 that are narrow at their upper ends and widen gradually toward their lower ends. Air is admitted into these chambers from the exterior of the housing due to the provision of air inlet openings 24 in the side walls of the housing.

25 is a spreader, of inverted V-shape in cross section, that extends longitudinally in the housing 18. This spreader is located immediately beneath the burner in the housing 18 and also serves as a superheater for the gas in said burner, thereby increasing the efficiency of action of the burner.

26 designates a burner pipe located within the housing 18 near its top and extending longitudinally of the housing above the spreader 25 (see Figs. III and IV). This burner pipe has arranged therein a plurality of burners 27 having outlet ducts 28 that are controlled by valve rods 29, preferably terminating in needle valves that enter into the ducts 28. Fuel is delivered to the burner pipe 26 to be discharged therefrom through the burners 27 through a flexible conducting pipe 30 leading from the fuel tank 12 to the burner pipe.

31 designates a roller arranged in front of the burner housing 18 and supported by said housing through the medium of arms 32 fixed to the housing. This roller is designed to depress weeds that may be encountered thereby during the operation of my weed burning apparatus, so that such weeds may be lowered to the ground to be readily passed over by the burner housing, in order that a flame directed downwardly therein from the burners may effectually destroy the weeds by burning them as the housing passes thereover.

33 designates shields located at the ends of the burner incasing housing 18 and which preferably comprise plates with insulating material between them, as seen in Figs. IV and V. These shields are employed to prevent the spreading of flames ejected from the burner incasing housing to points beyond the ends of the housing, so that the burning of the weeds will be confined to a given course corresponding in width to the width of said housing. The shields are connected to the housing at its ends by hinges, the hinge at the end of the housing supported by the post 17 being located at the front of the housing, while the hinge at the opposite end is located at the rear of the housing, as seen in Fig. I. The hinges just mentioned comprise leaves 34 attached to the housing and provided with ears 35; leaves 36 attached to the shields and each provided with an ear 37; and pivot pins 38 immovably mounted in the ears 35 of the hinge leaves 34, see Figs. III and V. The ears 37 of the hinge leaves 36 receive set screws 39 that are adapted to bear against the pivot pins 38 for the purpose of holding the shields 33 from movement after they have been adjusted relative to the ends of the burner incasing housing 18.

In the practical use of my weed burning apparatus, the burner housing and appurtenances associated therewith may be readily adjusted relative to the main frame by moving the bracket 19 upwardly or downwardly upon the post 17, in order that these parts may be placed at the preferred elevation above the ground. When they are so adjusted they are held from movement relative to the frame through the medium of the set screw 20. When it is desired to burn weeds to the fullest capacity of the apparatus, the housing and its appurtenances are arranged at a right angle to the main frame, as seen in full lines Fig. I. If, however, it is desired to burn weeds in a course of less width than that in which they would be burned while the housing is at right angles to the main frame, the housing is swung into the position illustrated in dotted lines, Fig. I, in which event the shields 33 are swung into positions at oblique angles relative to the housing, as seen in dotted lines, and held in such positions under the ends of the set screws 39.

While I have described my apparatus as intended for use in burning weeds, I wish it understood that I do not limit myself to the use of the apparatus for this particular purpose, inasmuch as it may be successfully employed for other purposes, such as for instance, the melting of ice upon roadways or pavements in winter.

I claim:

1. In an apparatus of the character described, a main frame, a burner housing carried by said frame, laterally movable shields hinged to said housing at its ends, the hinge at one end being located at the front of the housing and at the other end at the back of the housing, and a burner in said housing.

2. In an apparatus of the character described, a main frame, a burner housing pivotally connected to said frame, means for holding said housing in different positions, shields hinged to said housing at its ends, means for holding said shields at either right angles or oblique angles relative to said housing, and a burner in said housing.

3. In an apparatus of the character described, a main frame, an adjustable burner housing pivoted to said frame, a burner in said housing, horizontally movable shields hinged to the ends of the burner housing and extending beyond the front and back thereof, and means for holding said shields at different angles relative to said adjustable burner housing.

4. In an apparatus of the character described, a main frame, a burner housing pivotally supported by said main frame providing for horizontal movement of the housing to position it at a right angle or less than a right angle relative to the front of said frame, a burner in said housing, and means for preventing spread of the flame in said housing beyond the ends of the housing when the housing is at either a right angle or less than a right angle relative to the front of said frame.

5. In an apparatus of the character described, a main frame, a burner housing pivoted to said frame at one of its sides providing for horizontal movement of the housing to position it at a right angle or less than a right angle relative to the front of said frame, a burner in said housing, and means for preventing spread of the flame in said housing beyond the ends of the housing when the housing is at either a right angle or less than a right angle relative to the front of said frame.

6. In an apparatus of the character described, the combination with a movably supported burner housing opening downwardly, of a burner in said housing, said burner being adapted to direct a flame downwardly, and a spreading device operatively related to said burner and adapted to direct the flame from said burner to each side in a lateral direction to spread the flame over an extended area of ground.

7. In a device of the character described, the combination with a burner housing mounted on wheels and flared downwardly, of a burner within said housing, a flame spreader disposed within said housing, said flame spreader being enlarged downwardly to correspond with the shape of the housing and operatively related to said burner, said burner being adapted to project the flame on both sides of the flame spreader whereby the flame is spread over an extended area of ground.

8. In an apparatus of the character described, the combination with a traveling burner housing opening downwardly, of a depending burner in the upper portion of said housing, and a flame spreader tapered to a point with said point adjacent the outlet of said burner, the flame from said burner being thereby spread through the open end of said housing over an enlarged area of the ground.

HARRY P. WALTON.

In the presence of—
L. T. ANDERSON,
L. D. BONE.